March 16, 1926.
H. A. SHOWERS
REVERSIBLE CHECK VALVE AND STOP
Filed March 21, 1925
1,577,375
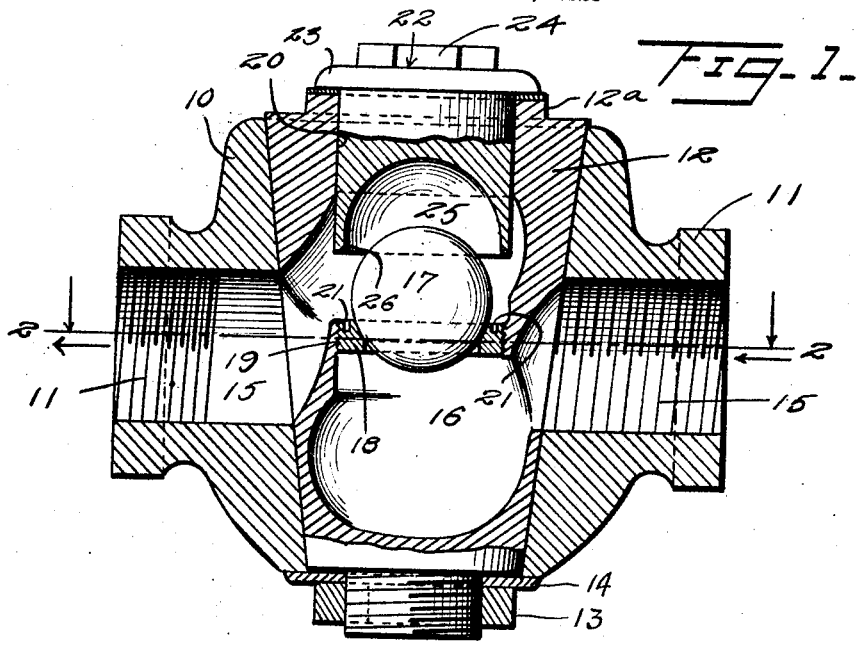
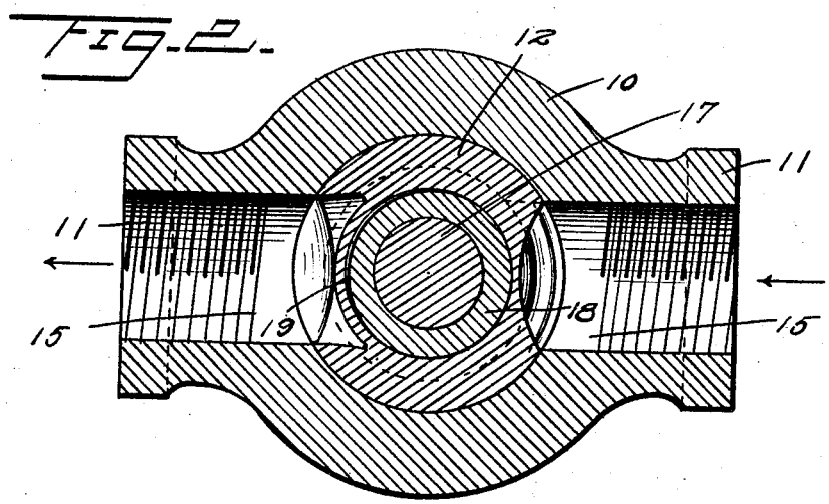
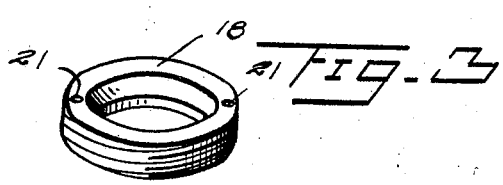
Inventor
H. A. Showers
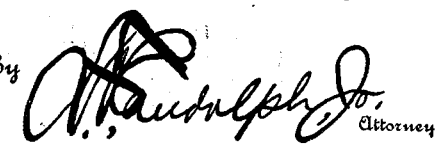

Patented Mar. 16, 1926.

1,577,375

UNITED STATES PATENT OFFICE.

HAROLD A. SHOWERS, OF GEUDA SPRINGS, KANSAS.

REVERSIBLE CHECK VALVE AND STOP.

Application filed March 21, 1925. Serial No. 17,302.

*To all whom it may concern:*

Be it known that I, HAROLD A. SHOWERS, a citizen of the United States, residing at Geuda Springs, in the county of Sumner and State of Kansas, have invented certain new and useful Improvements in Reversible Check Valves and Stops; and I do hereby declare the following to be a full, clear, and exact description of the invention, such as will enable others skilled in the art to which it appertains to make and use the same.

This invention relates to a controlling valve in the nature of a reversible check valve and stop cock.

It is aimed to provide a novel construction wherein the valve may be of the ball type, have a removable seat, and the ball be partly held in place by a cap or plug, the opening accommodating the latter being of a size to permit insertion of the ball and its seat, and the cap particularly having a ground joint to afford an effective seat and at the same time one which will not be marred by the insertion of a tool incidental to the removal or application of the valve seat.

An operative embodiment is illustrated in the accompanying drawings wherein:—

Figure 1 is a view in central longitudinal section;

Figure 2 a horizontal sectional view, and

Figure 3 is a detail perspective view of the removable valve seat member.

Referring specifically to the drawings, 10 designates a valve casing of appropriate size and shape having opposed coupling ends 11 adapted for connection with pipes as usual and which are preferably hexagonal exteriorly or otherwise shaped for engagement by a wrench. Rotatably mounted in the casing 10 is a tapered plug 12 preferably held in place by a nut 13 threaded thereto and a washer 14. The ends 11 have passages 15 therethrough adapted for connection to a passage 16 of the plug 12. Plug 12 has a hexagonal or other suitably shaped wrench-engaging head 12ª.

A valve in the form of a ball 17 controls the flow through the passages 15 and 16 and is adapted to seat on a removable seating member or ring 18 screw threaded at 19 to the plug midway in passage 16. The ring 18 is applicable and removable vertically through a central opening 20 of the plug 12 which communicates with the passage 16. To facilitate turning of the ring 18, it may have recesses 21 in its upper surface for engagement by a specially formed wrench or tool.

Seated in the opening 20 by a ground joint and thus frictionally and against accidental displacement is a cap 22 which has an outwardly extending flange 23 to rest on the upper surface of the head 12ª within the margin of the latter so as not to interfere when the latter is engaged by a wrench. Cap 22 has a suitable wrench-engaging head 24 for engagement to facilitate turning for removal or replacement. The under surface of the cap 22 is recessed as at 25 to accommodate the opening movement of the ball valve 17 and to provide a flange at 26 which guides and limits the movement of the ball valve 17 and positions the same operatively with respect to its seat.

In view of the ground joint at 20, when the cap 22 is removed, the ball 17 and ring 18 may be readily removed or applied through such opening 20. Also a wrench or tool used to loosen or tighten the ring 18 by engagement against the wall 20 will not mar the same as would be the case if it had screw threads or the like.

It is obvious that material flowing from the right may elevate the valve 17 while material flowing from the left will not affect it. Through the turning of the valve 12 180°, the valve 17 will be so disposed that material flowing from the left will elevate the valve while material flowing from the right will not affect it. At the same time, if the valve is to serve as a stop it may be turned so as to dispose an unbroken portion thereof opposite the passages 15 as shown in Figure 2.

Changes may be resorted to provided they fall within the spirit and scope of the invention.

I claim as my invention:—

A device of the class described comprising a valve casing, a plug rotatable in said casing to coact with the passage thereof, said plug having a substantially central opening, a valve seat member insertable into said opening and having threaded engagement with the plug at the base of the opening, a ball valve insertable through said opening and engaging said valve seat member, a wrench-engaging head on said plug, a cap extending into said opening and having a ground joint connection with the opening, the inner end of said cap being cut away to restrain movement of the ball valve, said cap being downwardly extended to lengthen the zone of the ground joint connection and to enable the cutaway portion aforesaid to be provided, said cap having an outwardly extending flange resting on said head, and said cap having a wrench engaging head projecting above the flange and inwardly of its margin.

In testimony whereof I affix my signature.

HAROLD A. SHOWERS.